United States Patent [19]

Shemitz et al.

[11] Patent Number: 5,096,151
[45] Date of Patent: Mar. 17, 1992

[54] MOUNTED CANTILEVER BRACKET

[75] Inventors: Sylvan R. Shemitz, Woodbridge; Flemming Brygger, Guilford; Bruce W. Jones, New Haven; Jane-Nell Ryan, Bridgeport, all of Conn.

[73] Assignee: Sylvan R. Shemitz Associates, Inc., West Haven, Conn.

[21] Appl. No.: 708,096

[22] Filed: May 24, 1991

Related U.S. Application Data

[63] Continuation of Ser. No. 348,977, May 9, 1989, abandoned.

[51] Int. Cl.⁵ .............................. F16M 13/00
[52] U.S. Cl. ........................ 248/285; 248/289.1
[58] Field of Search ............... 248/285, 289.1, 208, 248/209, 236, 145, 298, 299; 182/147, 150, 57–61; 212/223, 229, 230, 254

[56] References Cited

U.S. PATENT DOCUMENTS

| 490,632 | 1/1893 | Ransome | 182/150 X |
|---|---|---|---|
| 839,667 | 12/1906 | Lanier | 248/285 X |
| 1,162,608 | 11/1915 | Hohl | 248/285 X |
| 2,501,752 | 3/1950 | Ambrosius | 248/298 X |
| 2,513,403 | 7/1950 | Dakin | 182/61 X |
| 2,979,296 | 4/1961 | Groocook | 248/285 X |
| 3,048,360 | 8/1962 | Foley | 248/285 X |
| 4,004,778 | 1/1977 | Steinhagen | 212/223 X |
| 4,395,749 | 7/1983 | Poveromo | 248/289.1 X |

FOREIGN PATENT DOCUMENTS 758925  1/1934  France ..................... 182/61

Primary Examiner—Alvin C. Chin-Shue
Attorney, Agent, or Firm—Jeffrey H. Ingerman

[57] ABSTRACT

A mounted cantilever bracket is provided in which a cantilever is secured in a sleeve bearing assembly, is mounted to a wall or parapet by means of vertical trusses, at least one supporting brace, at least one horizontal support, and an angle support landing, and is easily and safely disengaged by a locking pin to horizontally swivel about a vertical fulcrum bolt. A mounted cantilever bracket is provided such that repair and maintenance of fixtures attached to the exteriorly extended end of the cantilever may be accomplished safely and expediently.

19 Claims, 4 Drawing Sheets

MOUNTED CANTILEVER BRACKET

This is a continuation, of application Ser. No. 07/348,977, now abandoned filed May 9, 1989.

BACKGROUND OF THE INVENTION

This invention relates to mounted cantilever brackets, and particularly, to a mounted cantilever bracket extremely well suited for secure attachment to walls or parapets where maintenance of the fixtures located at the exteriorly extended end of the cantilever has previously been difficult and hazardous.

Mounted cantilever brackets are employed to secure cantilevers that have fixtures attached at their exteriorly extended ends to walls or parapets (hereinafter referred to as "wall"). Mounted cantilever brackets are well-suited for use in outdoor or indoor applications. The supporting components of such mounting brackets are typically made from metal, although plastic, glass-fiber reinforced plastic, composites or treated wood may alternatively be used. The mounting bracket serves several key functions. First, it provides a means for permitting fixtures to be securely displayed on an extension from a wall or roof of a building or similar structure. Such fixtures may be lighting means, ornamental designs, flags, audiovisual devices, and the like. Second, it ensures attachment of the cantilever to the wall of the building or structure while the fixture is prominently exhibited. Third, where the fixture being displayed is a lighting means, it provides a way for light which emanates from the fixture to be distributed in a designated area below on the wall for enhanced illumination, or, alternatively, for it to illuminate broad regions on the horizontal plane below and adjacent the wall or parapet.

Originally, mounted cantilever brackets were engaged to permit fixtures to be viewed as extended from the walls to which they were affixed. However, traditionally mounted cantilever brackets have not permitted fixtures attached to the extended end of cantilevers to be maintained safely and efficiently. Specifically, it was difficult to reposition or realign the cantilever to permit a repair, reconstruction, or replacement of a fixture attached to its extended end.

The degree to which a cantilever secured by a mounting bracket will need to be maneuvered will vary depending on the requirements of the situation. For instance, if the cantilever is a flagpole, the flag can easily be removed using a common pulley mechanism with a cord attached, without the need to move the flagpole itself. However, such a solution would not work if the cantilever were supporting a relatively massive ornamental or lighting fixture. In such a case, it might be desirable to be able to move the cantilever rather than the fixture to permit maintenance or replacement.

The employment of a ladder or a ladder truck to access the fixtures from below may be both inconvenient and impractical because of the height of the exteriorly extended cantilever. Similarly, the use of a scaffold, lowered downward from the roof or higher floor of a tall building or structure to gain access from above introduces safety concerns with respect to the workers performing the job and the pedestrians below who may be injured by a falling object.

One known type of mounted cantilever bracket is mounted on a parapet and a cantilever is attached thereto. Maintenance of the fixture mounted at the end of the extended cantilever could be performed by swinging the cantilever upward so the cantilever is close to the parapet and the fixture is within the worker's reach. Alternatively, the cantilever could be swung sideways, but the fixture would remain outside of the wall, and a maintenance worker would have to perilously lean over the wall and reach down to the fixture. Also, there would be no means of securing the cantilever to the mounted bracket or the parapet while maintenance is performed. Thus, the cantilever may swing back in the direction from which it came, thereby injuring the worker attempting to repair or replace the fixture, or injuring another.

It would be desirable for a mounted cantilever bracket to remain securely fastened to a wall while permitting a cantilever, with a fixture attached thereto, to swivel horizontally, under control, over the wall. It would also be desirable for a mounted cantilever bracket to allow the cantilever to be disengaged from the mounted bracket to permit maintenance or replacement of a fixture attached to the extended end of the cantilever. It would further be desirable for a mounted cantilever bracket to temporarily secure the cantilever when it is so disengaged from the mounted bracket and pivoted horizontally to permit repair or replacement of a fixture attached to the extended end of the cantilever. Finally, it would be desirable for a mounted cantilever bracket to be securely fastened to a wall over which a cantilever extends, and to possess a safety mechanism to prevent the cantilever from swinging uncontrollably if the cantilever were to become disengaged from its mount.

SUMMARY OF THE INVENTION

It is an object of this invention to provide a mounted cantilever bracket that will remain securely fastened to a wall while permitting an attached cantilever to swivel horizontally, while under control, over the wall.

It is also an object of this invention to provide a mounted cantilever bracket from which the cantilever can be disengaged once a lock pin is released. Maintenance or replacement of a fixture attached to the extended end of the cantilever may thereby be performed easily.

It is another object of this invention to provide a mounted cantilever bracket that will temporarily secure the cantilever when it is disengaged from the mounted bracket. The cantilever may thus pivot horizontally to permit repair or replacement of a fixture attached to the extended end of the cantilever without fear of the cantilever becoming dislodged during the maintenance procedure.

It is a further object of this invention to provide a mounted cantilever bracket that will securely fasten to a wall over which a cantilever extends outwardly, and that possesses a safety mechanism to prevent the cantilever from swinging uncontrollably if the cantilever becomes disengaged from its mount.

In accordance with this invention, there is provided a mounted cantilever bracket for permitting the attachment to a wall of a cantilever which swivels horizontally over the wall to allow for maintenance or replacement of a fixture attached to the extended end of the cantilever. It is comprised of a cantilever, a sleeve bearing assembly with an opening for the cantilever to extend therethrough, and a means for securely mounting the sleeve bearing assembly to a wall, which permits the cantilever to easily be partially disengaged when repair or replacement of a fixture attached to the exterior end of the cantilever is required.

BRIEF DESCRIPTION OF THE INVENTION

The above and other objects and advantages of this invention will be apparent upon consideration of the following detailed description, taken in conjunction with the accompanying drawings, in which like reference characters refer to like parts throughout, and in which.

DETAILED DESCRIPTION OF THE INVENTION

Figure 1:
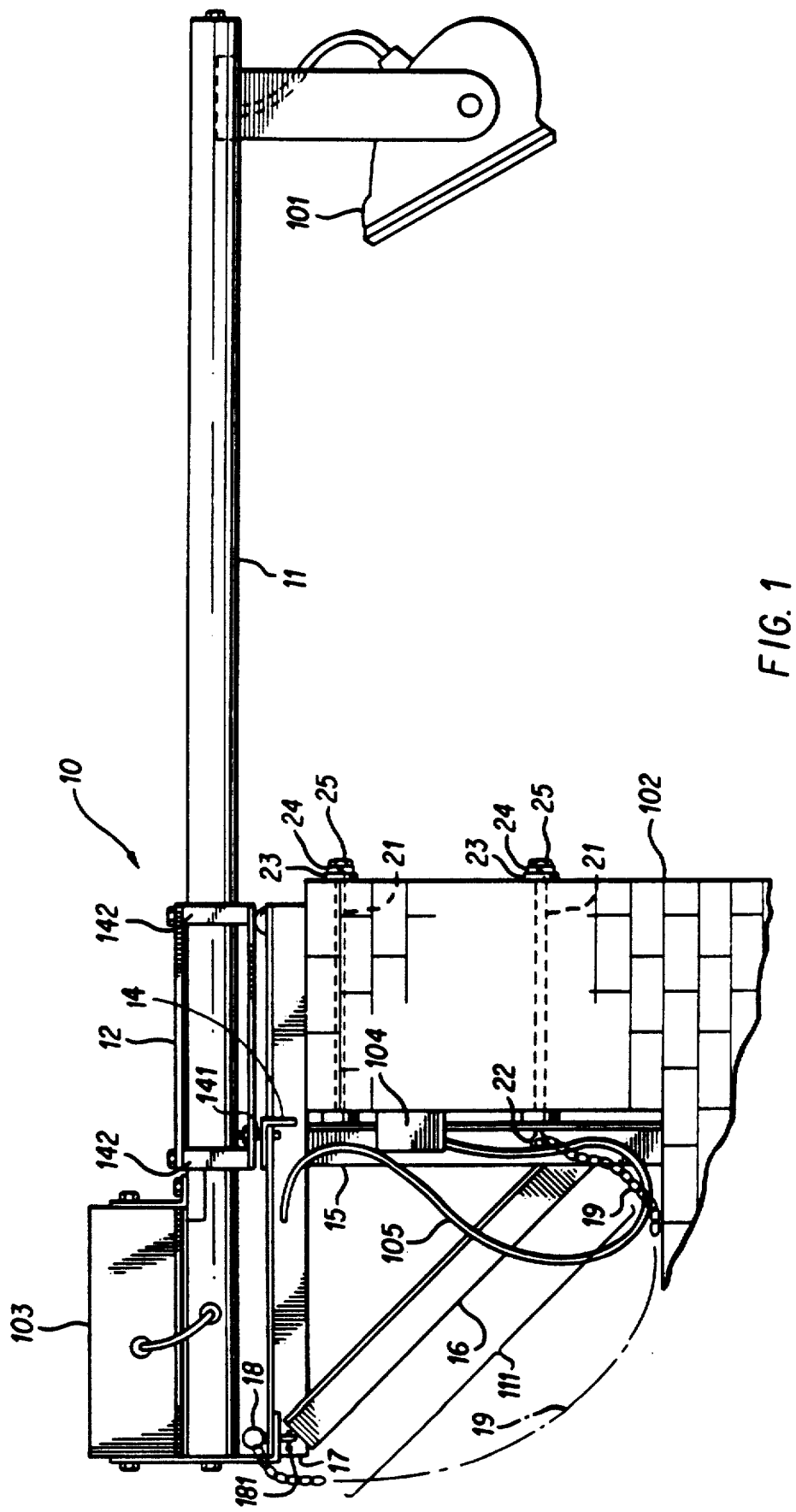
FIG. 1 is a side elevational view of a preferred embodiment of the mounted cantilever bracket of this invention.

A preferred embodiment of a mounted cantilever bracket according to the present invention is illustrated in FIGS. 1-4.

Mounted cantilever bracket 10 includes a cantilever 11 of circular cross section which is placed within a sleeve bearing assembly 12. Sleeve bearing assembly 12 contains at least one ring bearing 142, preferably two ring bearings 142, to secure cantilever 11. Alternatively, some other form of bearing might be used. An angle support landing 14 is placed directly on the underside of sleeve bearing assembly 12 and is rotatably attached thereto by a vertical fulcrum bolt 141 that extends downward from one end of the sleeve bearing assembly 12 and through an opening (not shown) at the midpoint of angle support landing 14. Angle support landing 14 is attached at its underside to truss 111 which is attached flush against the inner side of wall 102.

Truss 111 includes at least one vertical support 15, at least one angled support brace 16, and at least one horizontal support 17, and preferably two each of supports 15-17. Horizontal supports 17 extend from beyond the interior side of a wall 102 and through angle support landing 14 at cut-out regions (not shown) of angle support landing 14. Horizontal supports 17 extend away from wall 102 and are each supported by one end of complementary angled support brace 16 at the end of horizontal supports 17 away from the wall 102. The other end of each angled support brace 16 extends downward toward the wall 102 and is secured to vertical support 15. Vertical supports 15 are parallel to wall 102 and placed vertically flush thereto. Vertical supports 15 are attached to the undersides of both angle support landing 14 and horizontal supports 17.

Cantilever 11 is fixed relative to horizontal supports 17 at the interiorly extended ends of horizontal supports 17 by one or more removable lock pins 18. A mounting plate 30 is attached at its midpoint at the end of cantilever 11 remote from wall 102. Mounting plate 30 preferably is at least as wide as the distance separating horizontal supports 17. Extension tabs 33 are located at each end of mounting plate 30 and have openings 330 through which removable locking pins 18 may pass to fasten cantilever 11 to mounted cantilever bracket 10. Similar openings 31 in the horizontal faces of horizontal supports 17 adjacent to the end of horizontal support 17 remote from wall 102 align with openings 330 in extension tabs 33 to permit the placement of removable lock pins 18 therethrough. Cotter pin 181 passes through a hole (not shown) in shaft 182 of locking pin 18 to prevent accidental removal of pin 18.

Figure 2:
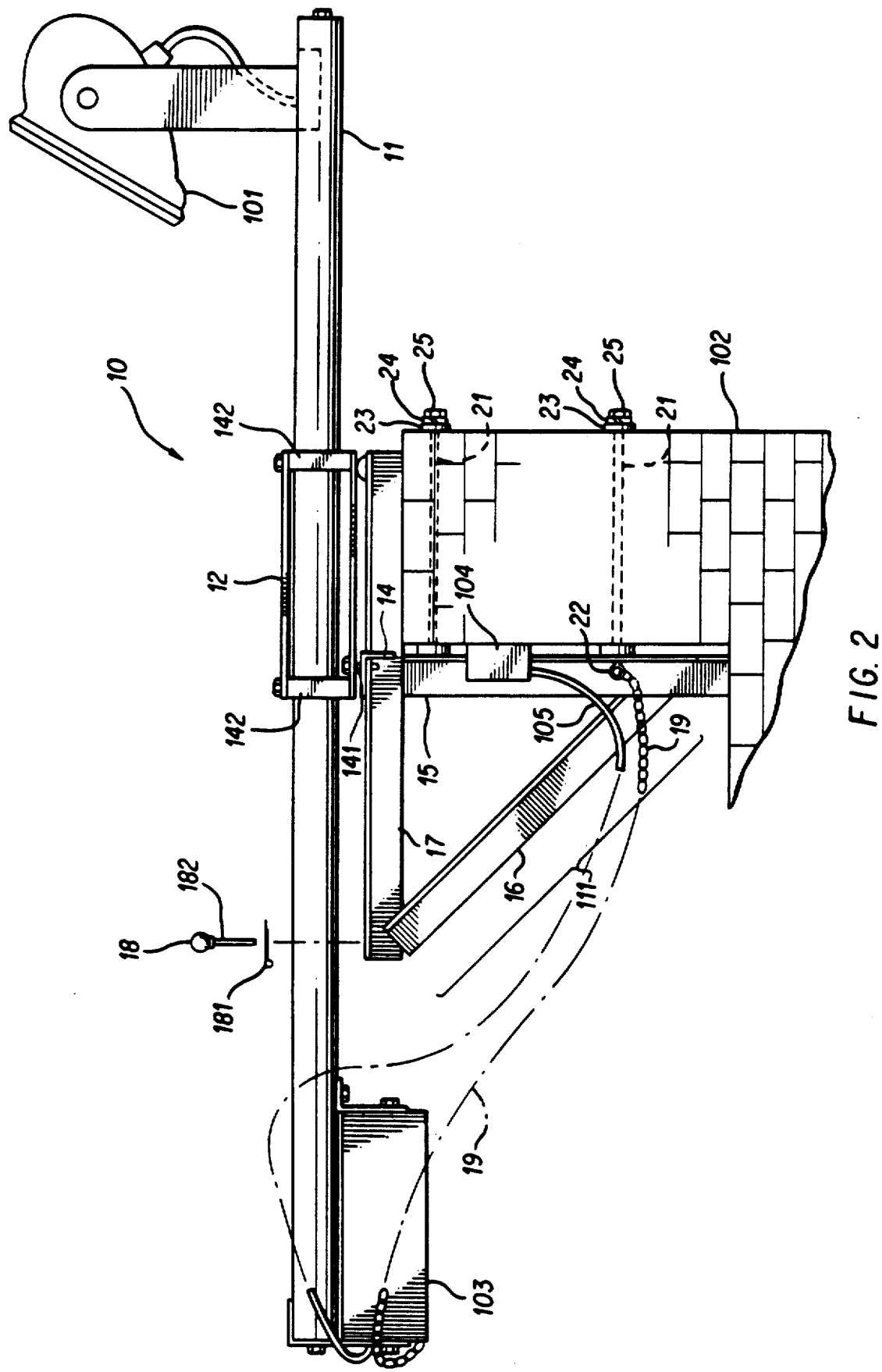
FIG. 2 is a side elevational view of the mounted cantilever bracket of FIG. 1 with the cantilever rotated 180° about its longitudinal axis.
Figure 3:
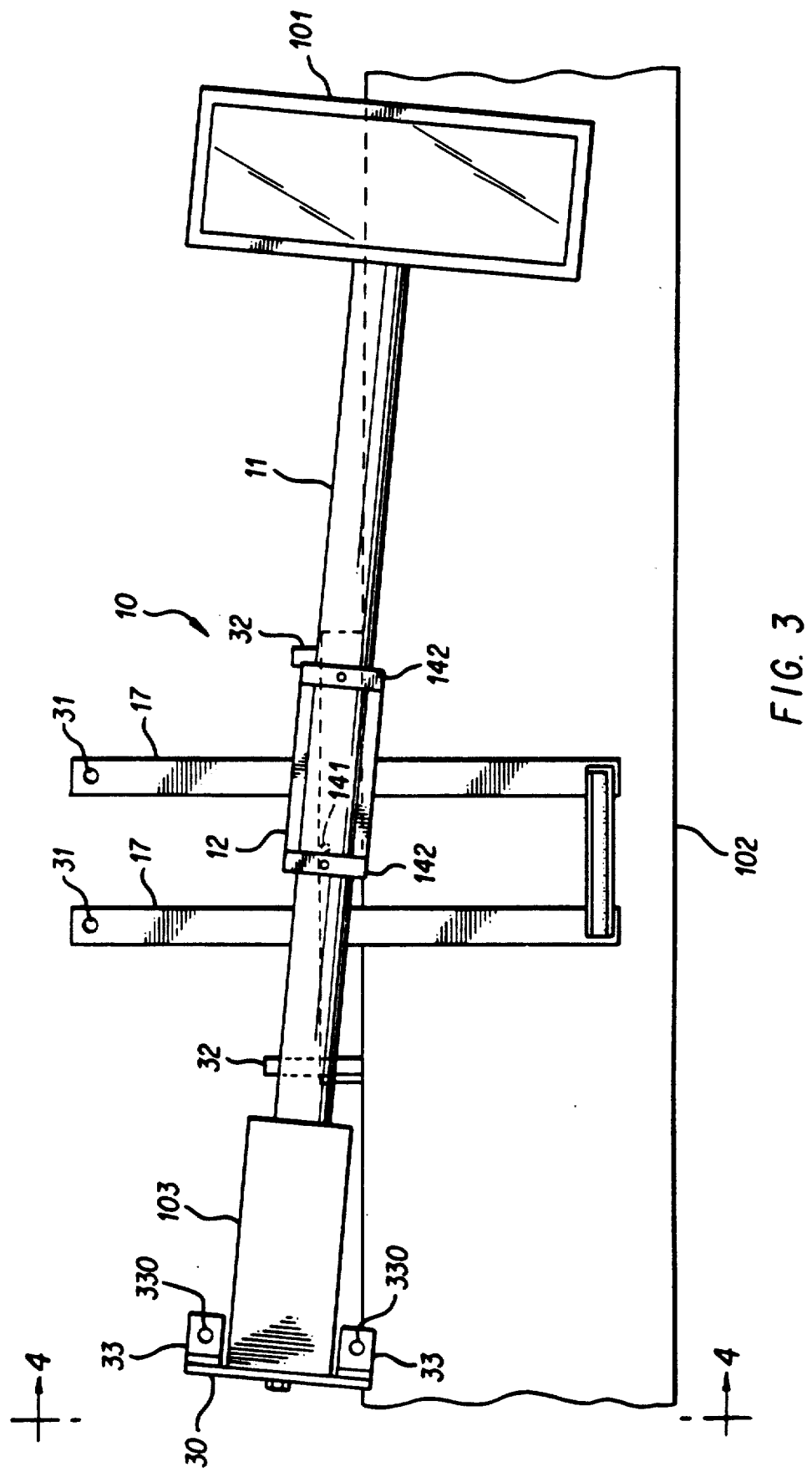
FIG. 3 is a plan view of the mounted cantilever bracket of FIGS. 1 and 2 wherein the cantilever has been swivelled about a vertical axis.
Figure 4:
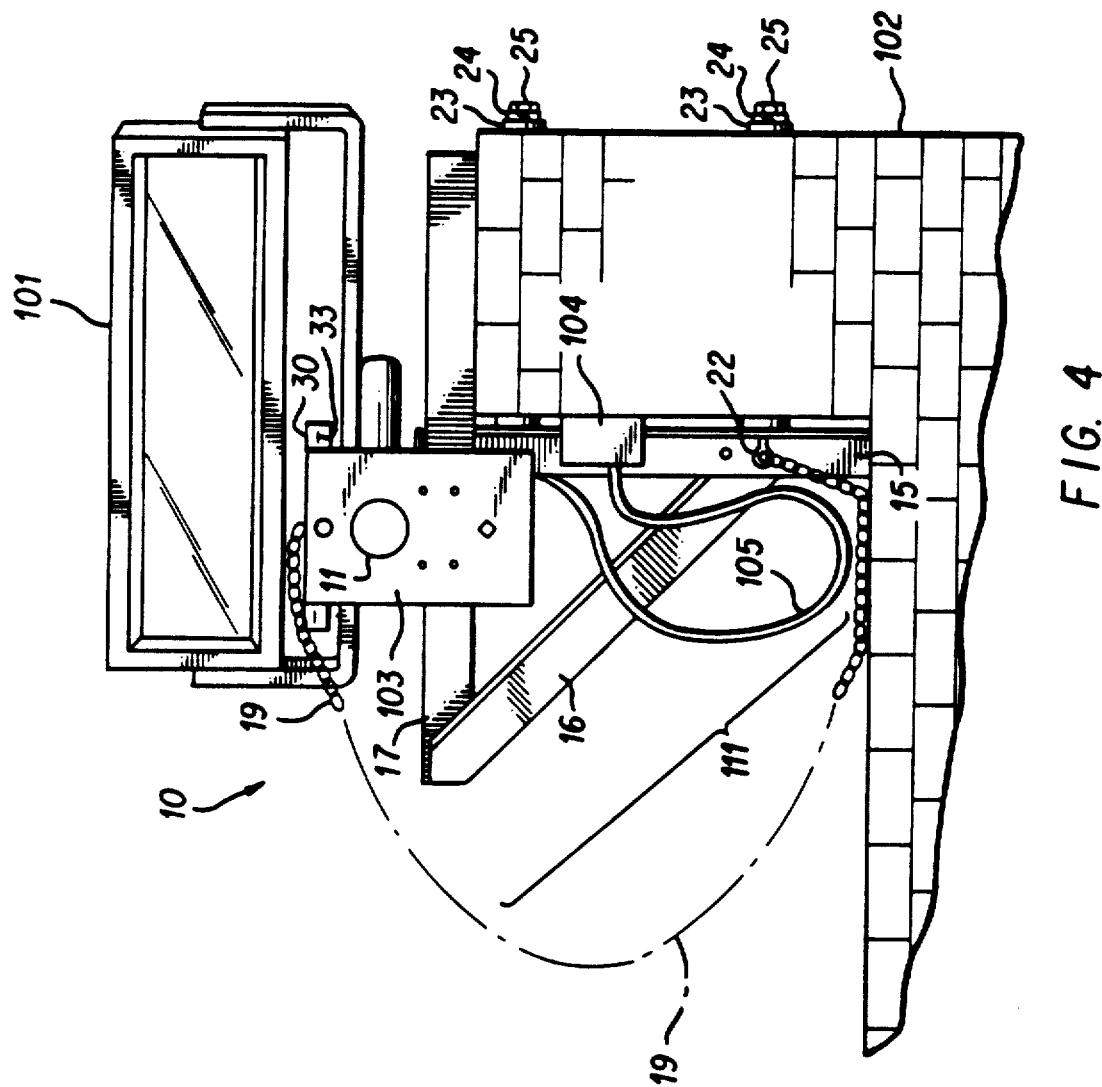
FIG. 4 is a side elevational view of the mounted bracket of FIGS. 1-3, taken from line 4—4 of FIG. 3.

As shown in FIGS. 1 and 2, mounted cantilever bracket 10 is securely fastened to wall 102 by at least one and preferably two bolts 21, passing through openings in vertical support 15 and complementary aligned openings in wall 102. Bolt 21 is fastened to wall 102 by washer 23, lock washer 24 and nut 25 on the outer side of wall 102. Alternatively, bolt 21 could be a lag bolt that is fastened to an anchor in the interior side of wall 102. At the inner side of wall 102, bolt 21 preferably has a safety loop 22 to which is attached one end of a safety chain, wire or cable 19. Safety chain, wire or cable 19 is attached at its other end to the interiorly extended end of cantilever 11. Therefore, if fulcrum bolt 141 breaks, safety chain, wire or cable 19 will prevent cantilever 11 from falling off wall 102 to the ground below. Similarly, if pins 18 break or are accidentally removed, safety chain, wire or cable 19 will prevent cantilever 11 from swinging uncontrollably.

In the normal position of cantilever 11, fixture 101 hangs below the top of the wall 102. When lock pins 18 are removed, cantilever 11 may be rotated in sleeve bearing assembly 12 about its longitudinal axis through a sufficient angle (e.g., 180°) that fixture 101 is above the top of wall 102. Cantilever 11 may then be brought toward the edge of wall 102 by swivelling cantilever 11 to the left or to the right of its normal position about an axis defined by vertical fulcrum bolt 141. Once cantilever 11 has reached a position nearly parallel to wall 102 locking clamps 32 may be engaged to temporarily lock cantilever 11 in that position in order to perform repairs or maintenance on cantilever 11 or fixture 101. Because cantilever 11 has been rotated axially so that fixture 101 is above wall 102, cantilever 11 can be brought in over wall 102, so that maintenance workers need not lean over wall 102, and cannot drop objects to the ground below.

If the fixture 101 is an electrical lighting fixture, an electrical junction box 104 may be fastened to one of the vertical supports 15 or to wall 102. Similarly, electrical cable 105 may run from the electrical junction box 104 to the ballast box 103 located on the interiorly extended end of the cantilever 11 and attached thereto. Ballast box 103 is utilized where fixture 101 is a gas-discharge light source. If ballast box 103 is present, mount 30 and extension tabs 33 may be attached thereto. In addition, if ballast box 103 is present, cantilever 11 may be pulled longitudinally inward before being rotated about its longitudinal axis, as shown in FIG. 2, so that ballast box 103 clears horizontal supports 17.

Cantilever 11 may be of hollow or solid construction. If fixture 101 is an electrical device such as a lighting fixture or audiovisual device, it is preferred that cantilever 11 be hollow so that electrical cable 105 can run inside cantilever 11 to fixture 101.

Cantilever 11, sleeve bearing assembly 12, angle support landing 14, vertical supports 15, horizontal supports 17 and angled support braces 16 may be made from metal, plastic, glass-fiber reinforced plastic, composites, treated wood, or the like. Preferably, all parts of truss 111 are made from steel. More preferably, these parts are made from stainless steel. Similarly, bolts 21 are most preferably made from stainless steel.

Thus, a mounted cantilever bracket is provided which permits the repair or maintenance of fixtures attached to the exteriorly extended end of a cantilever 11 that is secured to a wall 102. The repair and maintenance of these fixtures may be accomplished with safety and convenience by disengaging locking pin 18, horizontally swivelling cantilever 11 about vertical fulcrum bolt 141, and temporarily attaching cantilever 11 to wall 102 by fastening cantilever 11 to wall 102 with either locking clamp 32. One skilled in the art will recognize that the present invention can be practiced by other than the embodiments shown, which are presented for purposes of illustration and not of limitation, and the present invention is limited only by the claims which follow.

What is claimed is:

1. A mounted cantilever bracket for attachment to a wall, comprising:
   a cantilever having an end extending exteriorly from said wall and another end extending interiorly from said wall;
   a fixture mounted on said exteriorly extending end;
   a bearing assembly, said bearing assembly having an opening, said cantilever being received in said opening with freedom to rotate about a longitudinal axis of said cantilever;
   means for mounting said bearing assembly on said wall;
   means for rotationally connecting said bearing assembly to said wall whereby said cantilever can swivel in a horizontal plane over said wall while remaining securely fastened thereto, for permitting access to said fixture; and
   locking means for (1) when engaged, simultaneously preventing rotation of said cantilever along said longitudinal axis, translation of said cantilever along said longitudinal axis, and swivelling of said cantilever in said plane, and (2) when disengaged, simultaneously allowing said rotation, said translation and said swivelling; wherein:
   said bearing assembly cooperates with said rotational connecting means such that if said fixture is normally suspended below said cantilever, said fixture can be rotated about the longitudinal axis of said cantilever to a position above said cantilever for allowing said fixture to pass over said wall when said cantilever is swivelled.

2. The mounted cantilever bracket of claim 1, wherein said means for mounting said bearing assembly is a truss, said truss comprising:
   an angle support landing, said angle support landing normally being perpendicular to said cantilever and located thereunder, and having an opening therethrough;
   at least one vertical support, said angle support landing being attached thereto;
   at least one horizontal support, said at least one horizontal support being attached to said angle support landing and placed through said opening therein;
   at least one supporting brace, one end of said at least one supporting brace being attached to said at least one horizontal support and the opposite end of said at least one supporting brace being attached to said at least one vertical support; and
   means for fastening said vertical support of said truss to said wall.

3. The mounted cantilever bracket of claim 2, wherein said rotational connecting means comprises a vertical fulcrum bolt extending downward from said bearing assembly, said angle support landing having a fulcrum bolt receiving hole, said fulcrum bolt passing through said hole.

4. The mounted cantilever bracket of claim 1, wherein said rotational connecting means comprises a vertical fulcrum bolt extending from said bearing assembly downward toward said wall.

5. The mounted cantilever bracket of claim 1, wherein said bearing assembly further allows said cantilever to be translated axially before being rotated axially so that components attached to said cantilever clear said mounting means during said axial rotation.

6. The mounted cantilever bracket of claim 5 wherein said bearing assembly is a sleeve bearing.

7. The mounted cantilever bracket of claim 1 wherein said bearing assembly is a sleeve bearing.

8. The mounted cantilever bracket of claim 7, wherein said sleeve bearing assembly comprises at least one ring bearing on the inside surface thereof for receiving said cantilever.

9. The mounted cantilever bracket of claim 1, wherein said bearing assembly may be made from a material selected from the group consisting of metal, plastic, composites or glass-fiber reinforced plastic.

10. The mounted cantilever bracket of claim 1, wherein said cantilever is of solid construction.

11. The mounted cantilever bracket of claim 1, wherein said cantilever is of hollow construction.

12. The mounted cantilever bracket of claim 1, wherein said cantilever may be made from a material selected from the group consisting of metal, plastic, glass-fiber reinforced plastic, composites, or treated wood.

13. The mounted cantilever bracket of claim 1, wherein said means for mounting said bearing assembly may be made from a material selected from the group consisting of metal, plastic, composites or glass-fiber reinforced plastic.

14. The mounted cantilever bracket of claim 2, wherein said truss may be made from a material selected from the group consisting of metal, plastic, composites or glass-fiber reinforced plastic.

15. The mounted cantilever bracket of claim 2, wherein said angle landing support includes at least one locking clamp located at an end of said angled support landing whereby said cantilever may be temporarily attached to said angle support landing.

16. The mounted cantilever bracket of claim 15, wherein said angle landing support includes two locking clamps, one of said locking clamps located at each end of said angle support landing.

17. The mounted cantilever bracket of claim 2, wherein said cantilever is rotationally fixed relative to said truss by at least one removable locking pin, said cantilever and said truss each having at least one hole for receiving said locking pin, said hole in said cantilever being aligned with said hole in said truss when said cantilever is in its normal position.

18. The mounted cantilever bracket of claim 2, wherein said means for fastening said truss to said wall comprises at least one bolt, said at least one bolt being placed in an opening in said wall and extending through a complementary opening in said vertical support.

19. The mounted cantilever bracket of claim 18, wherein said bolt comprises a safety end loop at the end thereof at the interior face of said wall, said mounted cantilever bracket further comprising a safety chain, wire or cable attached thereto and to the interiorly extended end of said cantilever.

* * * * *

UNITED STATES PATENT AND TRADEMARK OFFICE
CERTIFICATE OF CORRECTION

PATENT NO. : 5,096,151
DATED : March 17, 1992
INVENTOR(S) : Sylvan R. Shemitz et al.

It is certified that error appears in the above-identified patent and that said Letters Patent is hereby corrected as shown below:

Column 3, line 3, "INVENTION" should be -- DRAWINGS --;

line 20, after "mounted" should be inserted -- cantilever --.

Signed and Sealed this

Seventh Day of June, 1994

Attest:

BRUCE LEHMAN

*Attesting Officer*     *Commissioner of Patents and Trademarks*